United States Patent [19]
Mix

[11] Patent Number: 5,407,607
[45] Date of Patent: Apr. 18, 1995

[54] STRUCTURED PACKING ELEMENTS

[76] Inventor: Thomas W. Mix, 24 Atwood St., Wellesley, Mass. 02181

[21] Appl. No.: 149,082

[22] Filed: Nov. 9, 1993

[51] Int. Cl.$^6$ .............................................. B01F 3/04
[52] U.S. Cl. ................................................. 261/112.2
[58] Field of Search ..................................... 261/112.2

[56] References Cited

U.S. PATENT DOCUMENTS

| | | |
|---|---|---|
| 1,887,704 | 11/1932 | Wilisch . |
| 2,206,440 | 7/1940 | Walker . |
| 3,051,453 | 8/1962 | Sluijters . |
| 3,151,675 | 10/1964 | Lysholm . |
| 3,235,234 | 2/1966 | Beaudoin . |
| 3,262,682 | 7/1966 | Bredberg .................... 261/112.2 |
| 3,266,787 | 8/1966 | Eckert . |
| 3,433,692 | 3/1969 | Gewiss . |
| 3,485,485 | 12/1969 | Faigle . |
| 3,568,461 | 3/1971 | Hoffman ...................... 261/112.2 |
| 3,589,687 | 6/1971 | Leybourne, III . |
| 3,618,910 | 11/1971 | Arndt . |
| 3,620,506 | 11/1971 | So . |
| 3,664,638 | 5/1972 | Grout . |
| 3,679,537 | 7/1972 | Huber et al. . |
| 3,704,869 | 12/1972 | Priestley . |
| 3,752,453 | 8/1973 | Doyne . |
| 3,775,234 | 11/1973 | Rich . |
| 3,887,664 | 6/1975 | Regehr . |
| 3,963,810 | 6/1976 | Holmberg . |
| 3,997,632 | 12/1976 | Kloss . |
| 4,027,058 | 5/1977 | Wootten . |
| 4,041,113 | 8/1977 | McKeown . |
| 4,067,936 | 1/1978 | Ellis . |
| 4,128,684 | 12/1978 | Bomio . |
| 4,179,222 | 12/1979 | Strom . |
| 4,186,159 | 1/1980 | Huber . |
| 4,195,043 | 3/1980 | Foote et al. . |
| 4,197,264 | 4/1980 | Degg . |
| 4,202,847 | 5/1980 | Ernst et al. . |
| 4,203,934 | 5/1980 | Leva . |
| 4,203,935 | 5/1980 | Hackenjos . |
| 4,277,425 | 7/1981 | Leva . |
| 4,296,050 | 10/1981 | Meier . |

(List continued on next page.)

FOREIGN PATENT DOCUMENTS

| | | |
|---|---|---|
| 211999 | 3/1956 | Australia . |
| 717195 | 6/1968 | Belgium . |
| 566518 | 11/1958 | Canada . |
| 0069241 | 6/1982 | European Pat. Off. . |
| 0170402 | 2/1986 | European Pat. Off. . |
| 1026320 | 4/1953 | France . |
| 2130621 | 3/1972 | France . |
| 684870 | 12/1939 | Germany . |
| 2060178 | 12/1970 | Germany . |

(List continued on next page.)

OTHER PUBLICATIONS

Newsfront, "Boosting Tower Performance by More Than a Trickle", *Chemical Engineering*, May 27, 1985, pp. 22–27.

"Structured Packings", *The Chemical Engineer*, Aug. 1988, pp. 28–30.

W. Meier et al., "Performance Characteristics of New High Efficiency High Capacity Oriented Lamellar Packing (Flexipac)", National A.I.Ch.E. Meeting, Mar. 20–24, 1977.

(List continued on next page.)

*Primary Examiner*—Tim Miles
*Attorney, Agent, or Firm*—Fish & Richardson

[57] ABSTRACT

A device for enhancing contact between a first fluid having a predominant direction of flow and a second fluid, comprises a layer of material generally disposed in a plane that is aligned with the direction of flow. The layer has a plurality of rows of corrugations projecting out of the plane for deflecting the fluids. Each row of corrugations is arranged in a diagonal with respect to the direction of flow so that an elongated vertex of each corrugation in said row is offset from the elongated vertex of an adjacent corrugation in the row with respect to the diagonal. Among other advantages, the offset, diagonally adjacent vertices are highly effective in interrupting the liquid and vapor flows, thereby improving mixing efficiency while also decreasing vapor pressure drop and increasing flow throughput.

27 Claims, 7 Drawing Sheets

U.S. PATENT DOCUMENTS

| | | |
|---|---|---|
| 4,324,749 | 4/1982 | Bronner . |
| 4,333,892 | 6/1982 | Ellis et al. . |
| 4,366,608 | 1/1983 | Nagaoka . |
| 4,374,542 | 2/1983 | Bradley . |
| 4,396,058 | 8/1983 | Kurschner et al. . |
| 4,496,498 | 1/1985 | Pluss . |
| 4,597,916 | 7/1986 | Chen . |
| 4,600,544 | 7/1986 | Mix . |
| 4,604,247 | 8/1986 | Chen . |
| 4,670,196 | 6/1987 | Hsia . |
| 4,701,287 | 10/1987 | Manteufel . |
| 4,710,326 | 12/1987 | Seah . |
| 4,740,334 | 4/1988 | Rukovena . |
| 5,063,000 | 11/1991 | Mix .................................. 261/112.2 |
| 5,158,712 | 10/1992 | Wilhelm ............................ 261/79.2 |

FOREIGN PATENT DOCUMENTS

| | | |
|---|---|---|
| 2208226 | 2/1972 | Germany . |
| 3140640 | 10/1981 | Germany . |
| 3222892 | 6/1982 | Germany . |
| 3901213 | 7/1990 | Germany .......................... 261/112.2 |
| 1004046 | 9/1965 | United Kingdom . |
| 1386955 | 3/1975 | United Kingdom . |
| 1573745 | 8/1980 | United Kingdom . |
| 772572 | 10/1980 | U.S.S.R. . |
| 1311767 | 5/1987 | U.S.S.R. . |
| 84/02088 | 6/1984 | WIPO . |
| 90/13354 | 11/1990 | WIPO . |

OTHER PUBLICATIONS

Van Winkle, *Distillation*, McGraw Hill, Inc., New York, 1967, p. 606.

Koch, Flexipac, "Tower Packing for Absorption, Distillation, Extraction, Heat Transfer biological Media For Aerobic and Anaerobic Water Purification", Bul. KFP-2.

Koch Sulzer Services, Koch Sulzer Rectification Columns, Bul. KS-1.

Chem-Pro/Montz, "$A_2$/High Efficiency/Low Pressure Drop Tower Packing", Bulletin HV-610.

Chen et al., "Development of a New Generation of High Efficiency Packing for Mass Transfer Operations", Glitsch, Inc., Dallas, Tex., Nov. 14–19, 1982.

Norton, "Liquid Distributors", brochure, Dec. 1976.

Chem Show Preview, advertisement, Chemical Engineering, p. 144, #A479 (Nov. 14, 1983).

Newsfront, "Structured is the Byword in Tower-Packing World", Chemical Engineering, Mar. 4, 1985, pp. 22–25.

STRUCTURED PACKING ELEMENTS

BACKGROUND OF THE INVENTION

This invention relates to structured packing elements for enhancing contact between fluids.

Various types of exchange columns have been known in which a gas and a liquid (i.e., fluids) come into contact with another, preferably in countercurrent flow. In some cases, use has been made of structured packing elements formed of layers of material (such as plates) that are generally disposed in a plane parallel to the column axis, and that include corrugations which project out of the plane in order to encourage contact between the liquid and gas. Adjacent layers contact one another at the corrugations. In such cases, the corrugations (which resemble folds in the layers) are disposed at a suitable angle (such as diagonally) to the column axis. Often, the layers also include fluting to further enhance fluid contact.

In some schemes, each corrugation continues uninterrupted along its entire length, and adjacent corrugations are disposed on opposite sides of the plane of the layer. Thus, the adjacent corrugations respectively resemble diagonal ridges and valleys on the plate. In other arrangements, each corrugation is comprised of a row of corrugations that alternately project oppositely from the plane of the layer so that the corrugations in the row alternate between ridges and valleys along the diagonal. In this latter case, it is seen that flow along a ridge becomes flow along a valley, and vice versa, to increase turbulence and vapor and liquid uniformity along a horizontal cross-section. At the ridge-valley interfaces, liquid flow is displaced from the layer and does not immediately return to the layer.

The corrugated layers are typically made from various materials, for example, textile fabrics (i.e, gauze) stiffened by interwoven metal wires, metallic fabric, fiberglass, plastic, ceramic, or sheet metal. Generally, packing elements which are made of foil-like material, such as sheet metal, are cheaper to produce than packing elements which are made of a self-wetting woven fabric. However, uniform distribution of the liquid (which is important for effective mass transfer or heat exchange with a gas phase) over the surface of a plate of foil-like material may not occur, because capillary forces may not come into operation.

Similarly, vapor flow up through the corrugations is sensitive to pressure differentials, generated in part by non-turbulent flow, pressure drag due to the generation of normal stresses in the flow, and non-homogeneous flow patterns through the grid structure. In sections of the flow up through a corrugation, flow tends to be more laminar going up the valley of a corrugation and turbulent where it is crossing a corrugation. Frictional turbulence along all channels and all adjacent openings provides uniformity and less propensity for fluid displacement and maldistribution or channeling of either the vapor or the liquid through certain portions of the packing element grid or its layers. Such dynamic action directly affects efficiency and mass heat interaction.

In some packing elements, the absence of any substantial degree of uniformly imparted frictional turbulence, generated by tangential stresses, through the adjacent corrugations and fluted areas decreases the uniformity and homogeneity of the flow pattern throughout the grid and reduces the efficiency and mass heat transfer characteristics of the packing.

SUMMARY OF THE INVENTION

In one general aspect of this invention, the corrugated layer has a plurality of rows of corrugations, and each row is arranged in a diagonal with respect to the direction of fluid flow so that an elongated vertex of each corrugation in the row is offset from the elongated vertex of an adjacent corrugation in the row with respect to the diagonal.

In preferred embodiments, elongated apertures (such as slits) are provided between adjacent corrugations in each row to help provide the offset. One result of the offset between adjacent corrugations in a row is that the vertex-to-vertex distance of adjacent rows of corrugations (measured perpendicularly to the diagonal) changes after each vertex offset.

The offset, diagonally adjacent vertices are highly effective in interrupting the liquid and vapor flows and mixing the flows on the two sides of the layer (the apertures pass fluid between the two sides of the layer). Liquid wetting of the layer is increased relative to packing layers in which adjacent corrugations in a row are positioned on opposite sides of the plane of the layer. The turbulence generated by the offset vertices keeps both gas and liquid boundary layers small, increases the efficiency of heat and mass transfer between the phases, and mixes both vapor and liquid streams on both sides of the packing element layers, which keeps bypassing and nonuniform concentrations at any horizontal level small.

The turbulence generated by the offset vertices may also increase the vapor friction factor, but the effect of this on pressure drop is counterbalanced by the fact that the vapor flow becomes more axial by flowing through the vertex offsets, which will decrease pressure drop. The improvements in efficiency also make it possible to obtain a mixing efficiency that equals the mixing efficiency of larger structured packing elements. One advantage of the smaller packing size enabled by the present invention is a decrease in vapor pressure drop and an increase flow throughput.

Further, the elongated apertures between adjacent corrugations assist in passing fluid flowing on one side of the layer to the other side of the layer. This enhances mixing efficiency and exposure of the liquid to vapor flow in turbulent regions. This is particularly true relative to schemes in which apertures, which impart relatively little direct turbulence to either the vapor or the liquid, are provided in planar flow areas.

Preferred embodiments include the following features.

In one embodiment, each row of corrugations is arranged so that the elongated vertices of adjacent corrugations in the row are offset in opposite directions with respect to the diagonal. In this case, the corrugations are also arranged so that the elongated vertex of each corrugation in the row is aligned with the elongated vertex of a next adjacent corrugation in the row with respect to said diagonal. (That is, the elongated vertices of every-other corrugation in the row are aligned.) Each row has a series of the elongated apertures, each of which is disposed between adjacent corrugations of the row. The apertures are elongated in a direction that is transverse (and preferably orthogonal) to the diagonal.

The corrugations of adjacent diagonal rows project in opposite directions with respect to the plane of the layer. For example, the corrugations of one row resemble ridges on the layer, while those of an adjacent row appear as valleys. In one configuration, the directions of elongation of the apertures in adjacent rows are offset from each other, with the apertures of each row being disposed between the apertures of the adjacent rows of corrugations along the diagonal. The apertures of next adjacent rows (i.e., every other row) are aligned with each other. In another approach, the directions of elongation of the apertures of adjacent rows of corrugations are aligned with each other. In this other approach, adjacent rows of corrugations are mirror images of each other.

In a second embodiment of the offset vertices feature of the invention, each row of corrugations is arranged so that the elongated vertex of each corrugation in a row is offset from the elongated vertex of every other corrugation in the row with respect to the diagonal. That is, none of the vertices in a row are aligned with each other along the diagonal. In this embodiment, as well, each row includes the series of elongated apertures. An elongated aperture is disposed between adjacent corrugations of the row. Each aperture is elongated in a direction that is transverse to the diagonal.

As with the first embodiment described above, the corrugations of adjacent rows project in opposite directions with respect to the plane of the layer. The apertures of adjacent rows of corrugations are generally aligned with each other. Preferably, the directions of elongation of the apertures are oblique to the diagonal, such as at an angle of between 10° and 170° with respect to the diagonal.

In one method of fabrication, the layer is first slit to form a flat pattern of the elongated apertures. Two parallel fold lines are then formed in the layer along the diagonal of each row. The layer is then pressed to form trapezoidal-shaped, diagonal rows of corrugations—that is, corrugations with flat sections between the parallel fold lines. The width of each flat section corresponds to the difference in location of the offset vertices. Next, the desired final form is achieved by pressing sideways on the trapezoids to convert them to triangular corrugations (with the elongated vertices) by pressing on one trapezoid from one direction and pressing on the adjacent trapezoid from opposite direction; this process is repeated for each trapezoids. Holes which penetrate the portion of the trapezoid which is pushed in will simplify the pushing operation by decreasing the force required to convert the trapezoid to a triangular shape.

In all embodiments, as well, the rows of corrugations preferably are arranged generally parallel to each other. The layers can be made of any suitable material, such as metal.

A layer having any of the configurations discussed above may be disposed with other layers to form a packing element. Preferably, the layers are arranged so that the rows of corrugations of adjacent layers are oriented in opposite diagonal directions with respect to the direction of flow. In addition, the layers are arranged so that at least some of the corrugations of adjacent layers are in contact. This further enhances mixing by encouraging the fluids to pass between the layers. In general, adjacent layers in the packing element preferentially have their elongated openings at equivalent horizontal levels.

The terms "elongated opening" or "slit" are meant to include both a narrow cut through the corrugation and one in which sheet material is removed. In general, each slit should have no more material removed than is necessary for convenience in manufacturing or than is necessary to avoid adjacent corrugations in a row from encroaching on each other.

Other features and advantages of the invention will become apparent from the following detailed description, and from the claims.

DESCRIPTION OF THE PREFERRED EMBODIMENTS

Structure

Figure 1:
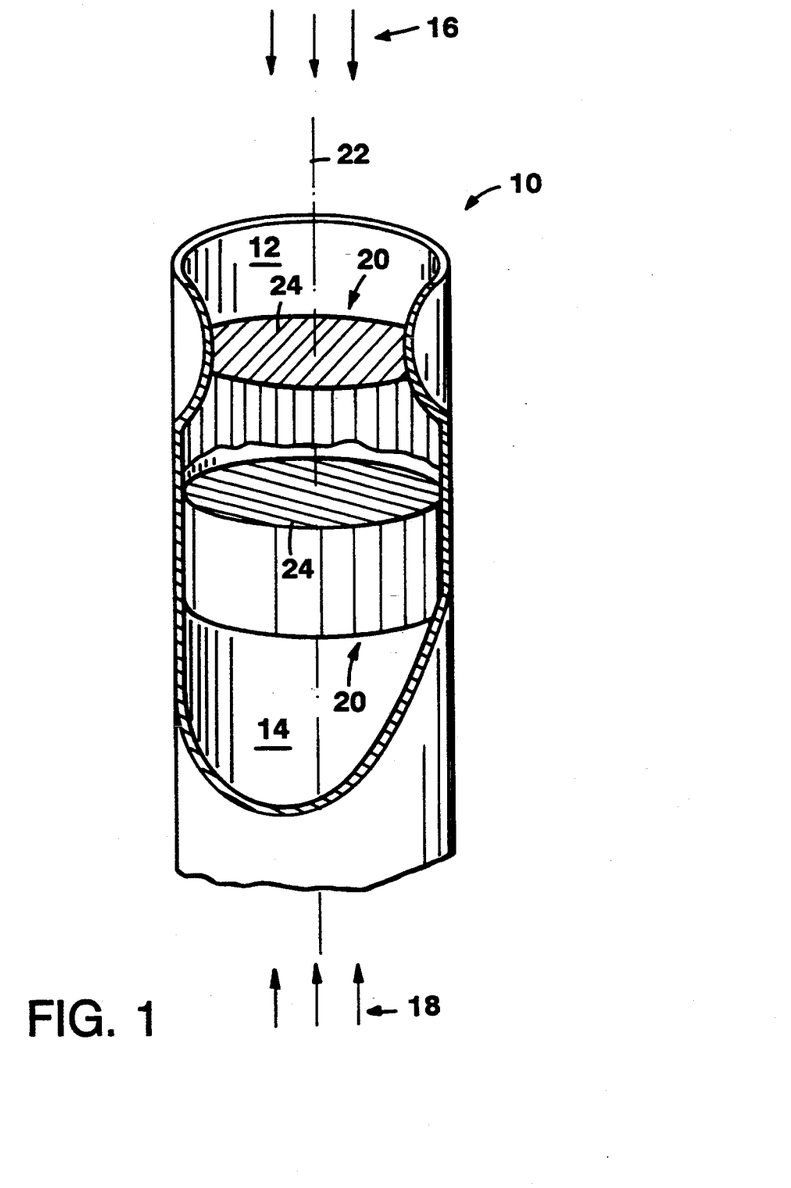
FIG. 1 is an isometric view, partially cut away, of a reaction chamber containing a stack of packing elements.

Referring to FIG. 1, a generally cylindrical reaction chamber 10 (e.g., a washing column or a distilling tower) carries two fluid streams 12, 14 that are meant to be mixed and to react within chamber 10. Fluid stream 12 (e.g., a liquid) is introduced into chamber 10 by a sprayer (not shown) and falls in a predominant direction of flow 16. A reboiler (also not shown) introduces fluid stream 14 (e.g. a gas), which rises in the opposite predominant direction of flow 18. A stack of identical, generally cylindrical packing elements 20 (of which two are shown) inside chamber 10 enhance the mixing of and reaction between fluid stream 12, 14 in a manner described in detail below. The vertical axis 22 of each packing element 20 is aligned with the predominant flow directions 16, 18.

Figure 2:
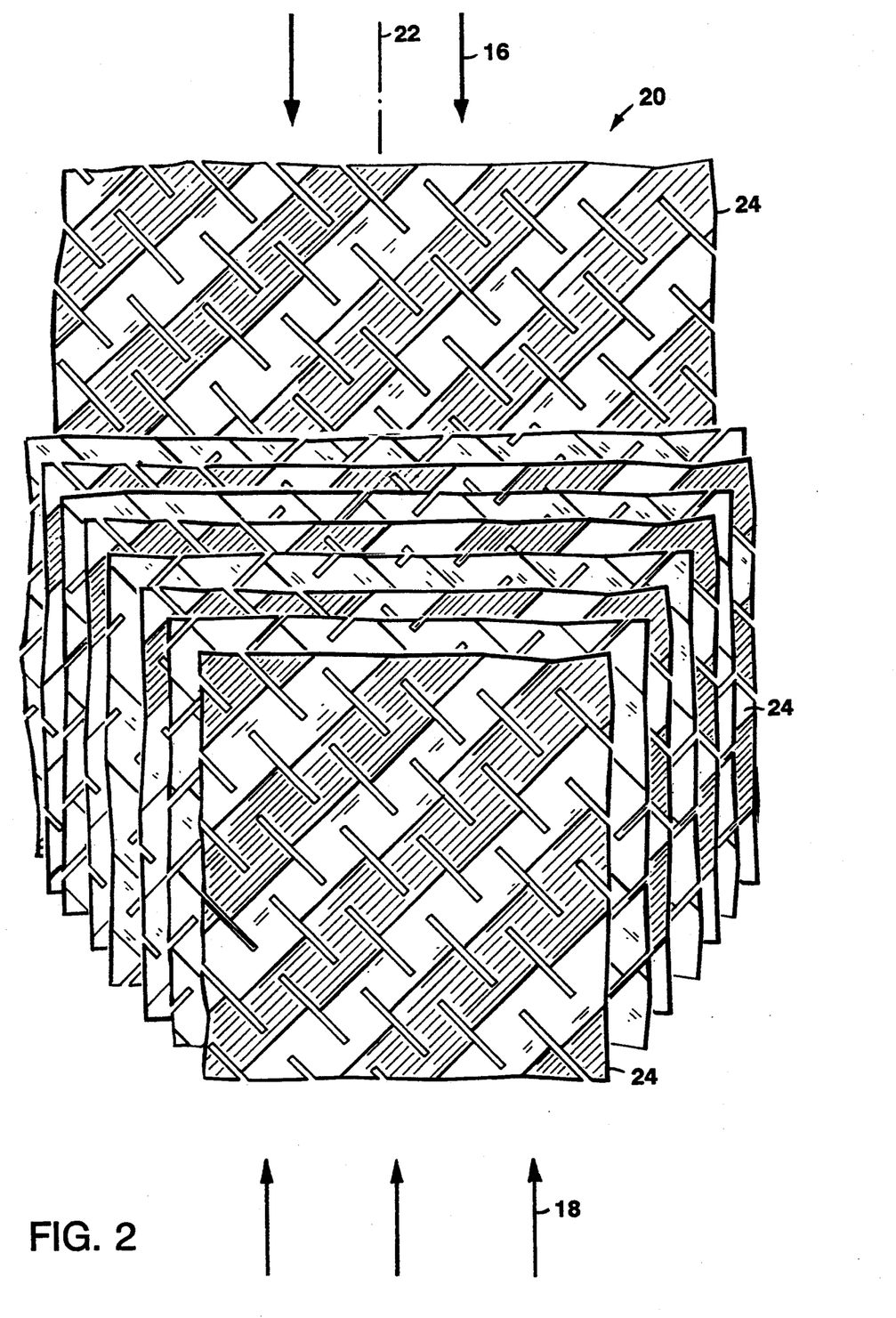
FIG. 2 is a diagrammatic view of a representative packing element of FIG. 1, with one layer of the packing element partially withdrawn.
Figure 3:
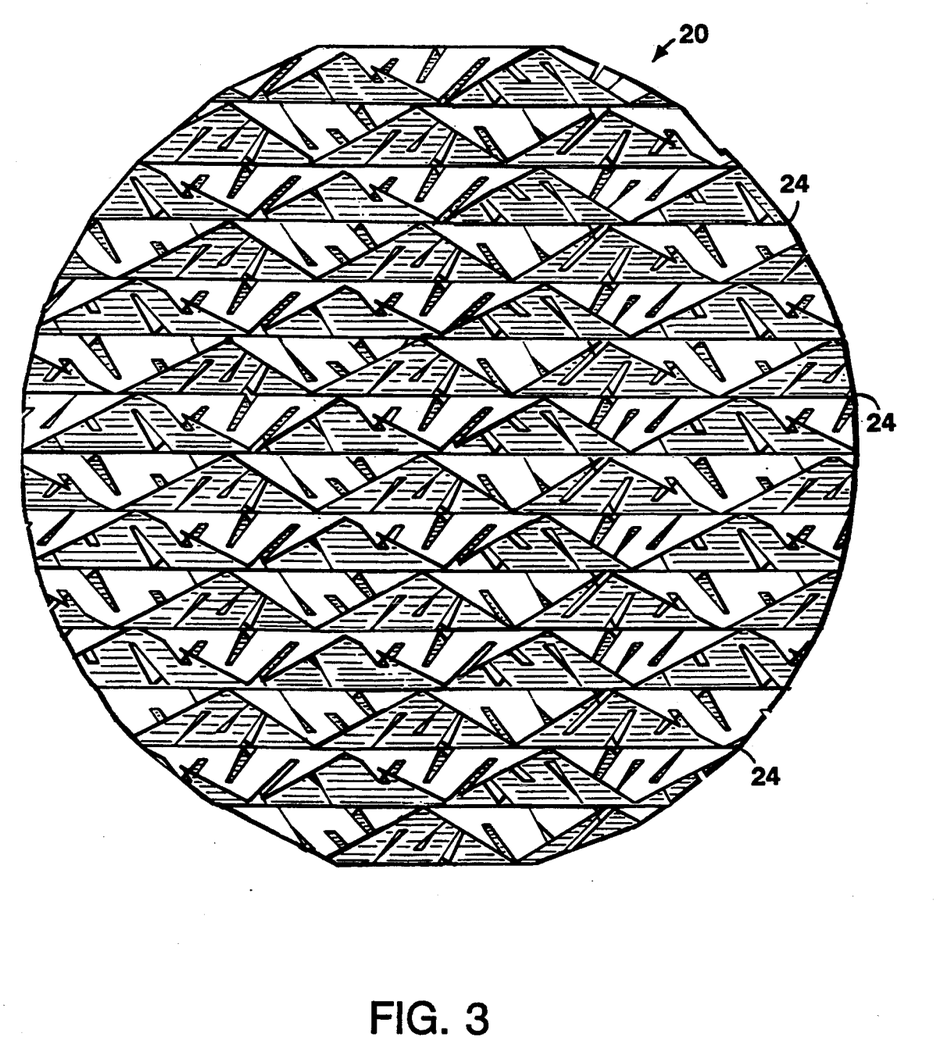
FIG. 3 is a top view of the packing element of FIG. 1, showing the first rows of deflection surfaces of layers according to a first embodiment of the invention.

Referring also to FIGS. 2 and 3, each packing element 20 includes a series of layers 24, each in contact with one or more adjacent layers 24. All layers 24 have the same height and thickness, but the width of layers 24 varies as shown to make the overall shape of packing element 20 generally cylindrical to fit tightly within chamber 10. As shown in FIG. 1, layers 24 of adjacent stacked packing elements 20 need not be angularly aligned with each other. Typically, adjacent packing elements 20 are placed in chamber 10 with their layers 24 oriented perpendicularly to each other. A pair of packing elements 20 can be fabricated as a unit (i.e., secured together), with layers 24 of the constituent packing elements 20 oriented at the desired angular relationship, and the unit installed in chamber 10. Adjacent units of layers 24 (or adjacent layers 24) can be keyed to ensure that the desired angular relationship is established.

Figure 4:
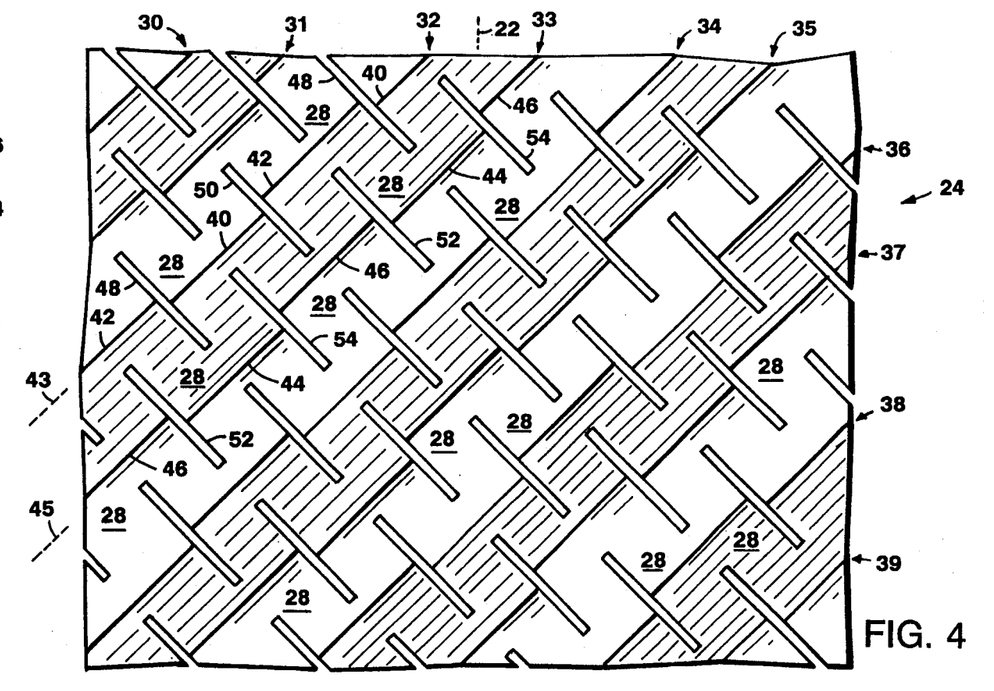
FIG. 4 is a front view of a packing element layer according to the first embodiment.
Figure 5:
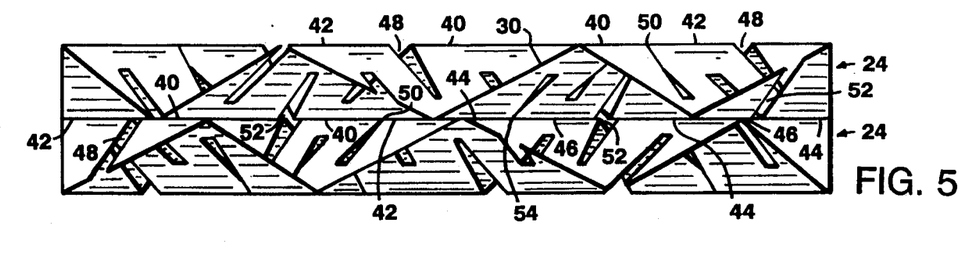
FIGS. 5 and 6 are top and side views, respectively, of two layers of FIG. 4 in contact in a packing element.
Figure 6:
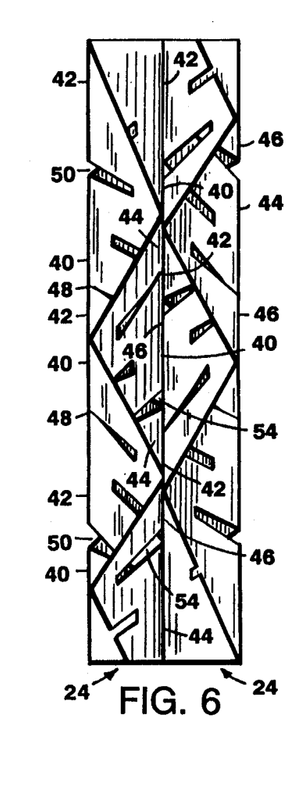

Referring to FIGS. 4–6, each layer 24 is formed from a single, flat sheet of metal in a manner described in detail below. Each layer 24 includes a plurality of rows 30, 31, 32, 33, 34, 35, 36, 37, 38, 39 of corrugations 28 that project out of the plane for deflecting fluids 12, 14. Rows 30–39 are disposed parallel to each other and diagonal with respect to directions of flow 16, 18 (and axis 22). Each corrugation 28 has an elongated vertex, and each row 30–39 of corrugations 28 are arranged so that the elongated vertex 40, 44 of each corrugation 28 in the row is offset from the elongated vertex 42, 46 of an adjacent corrugation 28 in the row with respect to the diagonal.

For example, elongated vertices 40 are offset from elongated vertices 42 as such vertices 40, 42 extend along diagonal 43. Likewise, elongated vertices 44, 46 are offset from each other as they generally extend along diagonal 45. Elongated vertices 40, 42 are offset by equal amounts in opposite directions from diagonal 43, as are vertices 44, 46 with respect to diagonal 45. Diagonals 43, 45 are parallel to each other.

Corrugations 28 in adjacent rows 30–39 alternately project in opposite directions with respect to the plane of the layer. As a result, elongated vertices 40, 42 are disposed on an opposite side of the plane of the layer from elongated vertices 44, 46. Elongated vertices 40, 42 lie in a single plane, as do elongated vertices 44, 46; these planes are parallel to each other and to a plane representing the mid-plane of layer 24. Moreover, the planes of vertices 40, 42 and 44, 46 are parallel to the orientation of rows 30–39 down layer 24. As a result, diagonal rows 30–39 of corrugations 28 form alternating, diagonal ridges (at vertices 40, 42) and valleys (at vertices 44, 46).

Along each row 30–39, adjacent corrugations 28 are separated by a series of elongated apertures (i.e., slits) 48, 50, 52, 54. More specifically, vertices 40, 42 are spaced by slits 48, 50, while slits 52, 54 separate vertices 44, 46. The vertex (e.g., vertex 40) between two adjacent slits (e.g., slits 48, 50) in a row is offset from the adjacent vertices (e.g., vertices 42). Each slit 48–54 is elongated in a direction that is orthogonal to diagonals 43, 45, and each slit 48–54 terminates before reaching an elongated vertex in an adjacent row 30–39.

Next adjacent vertices (i.e., every other vertex) in a row 30–39 are aligned along the diagonal. For example, vertices 40 are all diagonally aligned, as are vertices 42, 44, 46. Put another way, each elongated vertex 40, 42 between slits 48 and 50 is in line with every alternate vertex 40, 42 in the row. The same is true for elongated vertices 44, 46 separated by slits 52 and 54. Slits 48–54 have a finite, but small width for manufacturing ease.

Figure 6A:
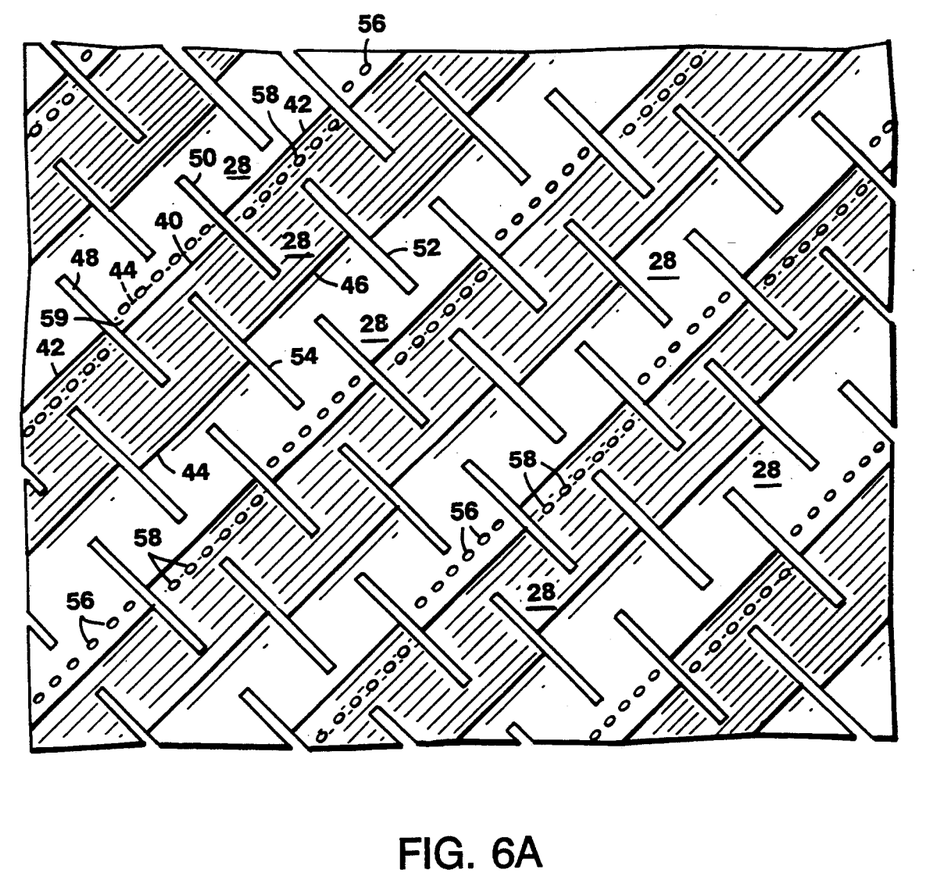
FIG. 6A shows a modification to the packing element layer of FIG. 4.

Referring also to FIG. 6A, one method of fabrication of layer 24 will be explained. A series of holes 56 are formed on one side of a vertex 40, 42 in every alternate row, and on the opposite side 58 of the adjacent vertices 42, 40 in the same row. This procedure simplifies fabrication. Layer 24 is slit to form a flat pattern of elongated apertures 48–54. Two parallel fold lines (e.g., 42, 44) are then formed in the layer along the diagonal of each row. Layer 24 is then pressed to form trapezoidal-shaped, diagonal rows of corrugations—that is, corrugations with flat sections 59 between the parallel fold lines 42, 44. The width of each flat section 59 corresponds to the difference in location of offset vertices 40, 42. Next, the desired final form is achieved by pressing sideways on the trapezoids to convert them to triangular corrugations (with the elongated vertices) by pressing on one trapezoid from one direction and pressing on the adjacent trapezoid from opposite direction; this process is repeated for each trapezoids. Holes 56, 58 are disposed in the portion of the trapezoid which is pressed, thereby will simplifying the pressing operation by decreasing the force required to convert the trapezoid to a triangular shape.

Figures 7, 8, 9:
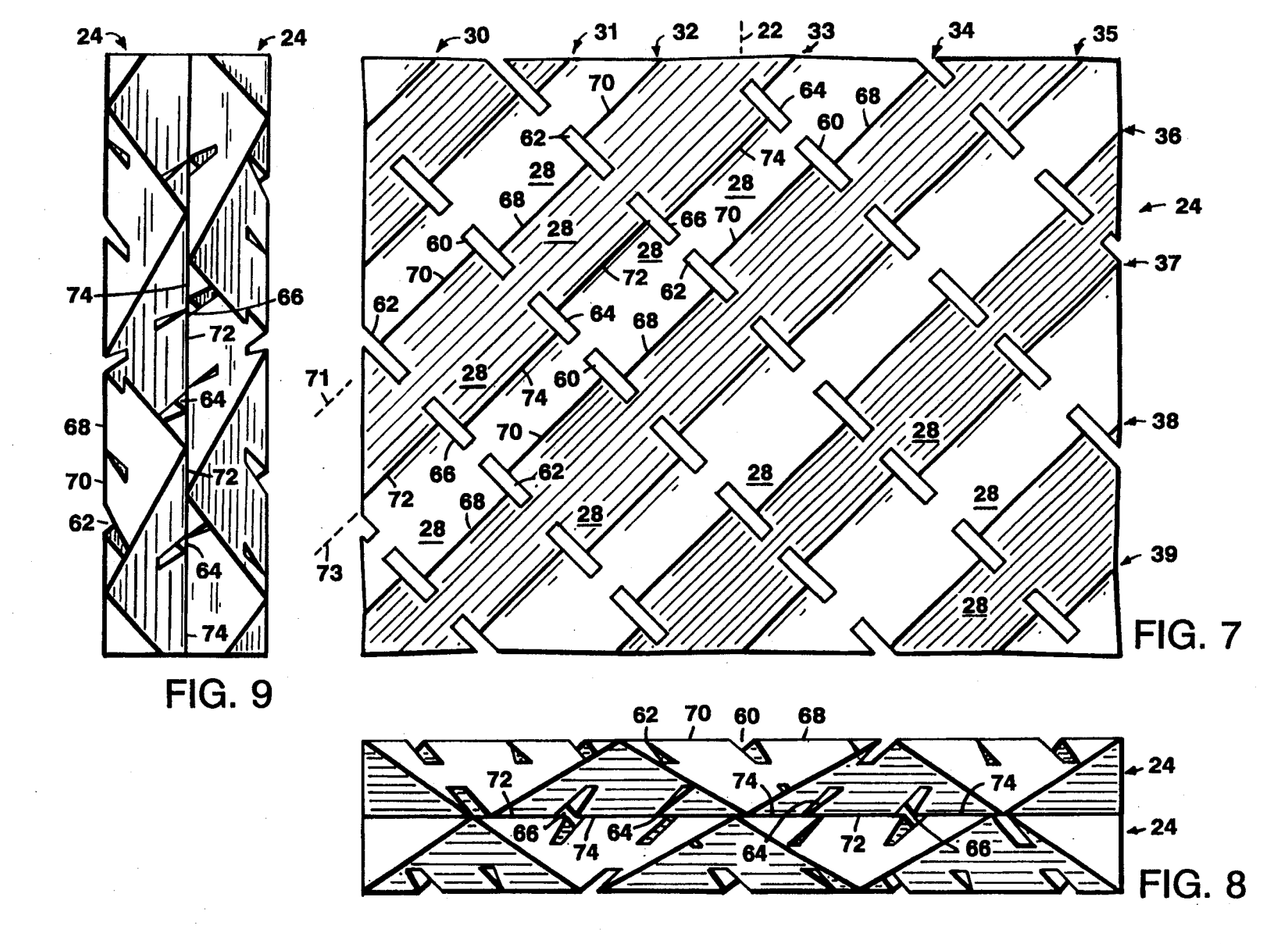
FIG. 7 is a front view of a packing element layer according to a second embodiment of the invention.
FIGS. 8 and 9 are top and side views, respectively, of two layers of FIG. 7 in contact in a packing element.

Referring to FIGS. 7–9, a second embodiment of the invention is shown. In this version, slits 60, 62 through one row are aligned with slits 64, 66 through adjacent rows. That is, slits 60, 64 are all aligned along the same diagonal line, and slits 62, 66 are also aligned diagonally. Adjacent, elongated vertices 68, 70 of corrugations 28 are offset by equal amounts and in opposite directions with respect to diagonal 71 and are separated by slits 60, 62. Next adjacent vertices (e.g., vertices 70) are diagonally aligned with each other. Similarly, elongated vertices 72, 74 (which are spaced by slits 64, 66) are offset by equal amounts and in opposite directions with respect to diagonal 73. Next adjacent vertices (such as vertices 74) are in alignment diagonally. Diagonals 71, 73 are parallel to each other.

Adjacent rows of corrugations 28 (e.g., rows 32, 33) are arranged to form corrugations 28 disposed on opposite sides of the plane of layer 24. That is, corrugations 28 having vertices 68, 70 project in the opposite direction from the plane of the layer than do corrugations 72, 74. Vertices 68, 70 are all arranged in a single plane, which is parallel to the plane in which vertices 72, 74 lie.

Figure 10:
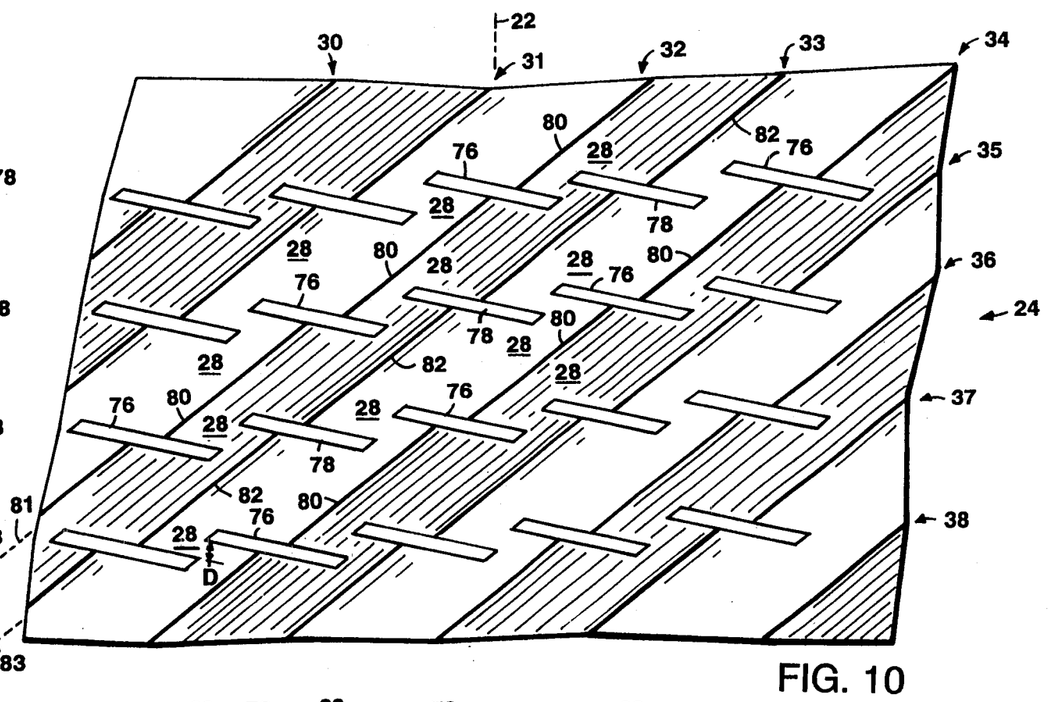
FIG. 10 is a front view of a packing element layer according to a third embodiment of the invention.
Figure 11:
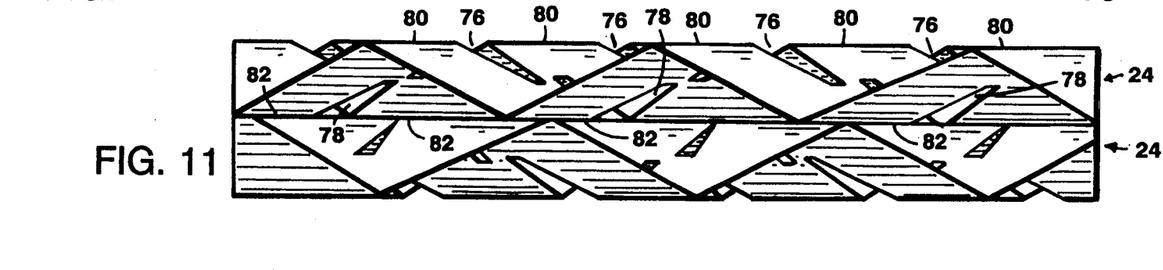
FIGS. 11 and 12 are top and side views, respectively, of two layers of FIG. 10 in contact in a packing element.
Figure 12:
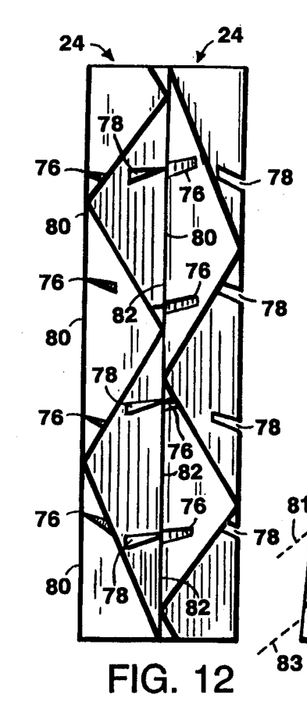

Referring to FIGS. 10–12, a third embodiment of the invention is shown. In this version, all rows (e.g., rows 32, 33) of corrugations 28 are arranged so that the elongated vertices 80, 82 of corrugations 28 in each row 32, 33 are all diagonally offset from each other. That is, adjacent vertices 80 in row 32 are all offset from each other and from diagonal 81 along which row 32 generally extends. Likewise, vertices 82 are all offset from each other and from diagonal 83 of row 33 (diagonals 81, 83 are parallel to each other). Each elongated vertex 80, 82 is offset from the adjacent vertex 80, 82 in the same direction and by the same amount. Because elongated vertices 80, 82 in a given row 32, 33 are progressively staggered with respect to diagonals 81, 83, it is seen that the slopes of vertices 80, 82 are less than the slopes of row diagonals 81, 83.

Adjacent elongated vertices 80 in row 32 are separated by slits 76; similarly, slits 78 space adjacent elongated vertices 82 in row 33. Slits 76, 78 are oriented at an oblique angle to respective diagonals 81, 83 such that the gap between slits 76, 78 of horizontally-adjacent corrugations 28 (as measured along line D normal to slits 76, 78) is large enough to give layer 24 the requisite mechanical strength. Distance D is, however, small relative to the spacing between horizontally-adjacent corrugations 28. The distance will generally be greater than one-sixteenth of an inch.

Corrugations 28 of adjacent rows 32, 33 project in opposite directions from the plane of layer 24 so that vertices 80 are disposed on the opposite side of the plane of layer 24 from vertices 82. Vertices 80 all lie in the same plane, as do vertices 82. The planes of vertices 80, 82 are parallel to each other and to the plane of layer 24.

In all of the embodiments discussed herein, the vertex-to-vertex distance between one row of corrugations and the adjacent row (measured in a direction perpendicular to the diagonals of the rows) changes after each vertex offset. For example, the pair of vertices (e.g., vertices 40, 42 in FIG. 4) that meet at a slit (e.g., slit 50) are spaced by different amounts from the vertex (e.g., vertex 46) of an adjacent row of corrugations. (The same can be seen to be true for the embodiments of FIGS. 7 and 10.)

Slits 48, 50, 52, 54, 60, 62, 64, 66, 76, 78 may have straight sides or curved sides, and can cross the associated vertex at an angle ranging from 10° to 170° to the associated diagonal. The spacing of slits 48, 50, 52, 54, 60, 62, 64, 66, 76, 78 along the associated diagonal can range from a fraction (such as ¼) of the spacing between horizontally-adjacent corrugations 28 to ten times such corrugation spacing. Preferably, the slit spacing is between being from one and four times the spacing between horizontally-adjacent corrugations 28.

The amount of offset between adjacent vertices 40-42, 44-46, 68-70, 72-74, 80-80, and 82-82 of corrugations 28 can vary from one-fiftieth to one times the spacing between horizontally-adjacent corrugations 28. The preferred spacing is between 1/16" and ⅜" for packings which have a ridge-to-valley height of the order of ½", and will increase with the height of the packing. But the preferred spacing will generally be less than one-third of the spacing between horizontally-adjacent corrugations 28.

The offset between the slits in one diagonal row of corrugations 28 and the slits in an adjacent diagonal row of corrugations 28 varies from zero to one-half times the spacing between slits in each row, and is a function of the configuration chosen. For example, in the embodiment shown in FIG. 4, slits 52, 54 are offset between slits 48, 50 by one half of the distance (along diagonal 43) between slits 48, 50. By contrast, there is no such offset between 60, 62, 64, 66 in the embodiment of FIG. 7.

Where we have used the term "slit," we mean to include both a narrow cut through corrugations 28 and a cut in which a finite amount of material of layer 24 is removed. In general, each slit should have no more material removed than is necessary for convenience in manufacturing or than is necessary to avoid adjacent corrugations 28 in a row from encroaching on each other.

Referring again to FIG. 3 (which illustrates the layer configuration shown in FIGS. 4–6), adjacent layers 24 are disposed in packing element 20 with their corrugations 28 oriented in opposite diagonal directions with respect to axis 22 (and directions of flow 16, 18). As a result, elongated vertices 40, 42, 44, 46 of adjacent layers 24 cross each other. Indeed, adjacent layers 24 are spaced so that their crossing corrugations are in contact.

While FIG. 3 illustrates this arrangement with respect to the embodiment of layer 24 shown in FIGS. 4–7, it should be understood that layers 24 of FIGS. 7–9 and layers 24 of FIGS. 10–12 are arranged in the same way in a packing element 20. That is, the corrugations of adjacent layers 24 are oriented in opposite diagonal directions and contact each other.

Operation

In operation of any of the embodiments described above, liquid 12 is distributed over and flows downwardly over both sides of each packing element layer 24, gas 14 (or other exchange medium) flows upwardly and makes contact and exchange with liquid 12 on the surface wetted by liquid 12. Liquid 12 flows over the inclined surfaces of corrugations 28 and over the offset vertices on both sides of layer 24, and is frequently caused to mix both internally and with liquid 12 on the opposite side of layer 24 as it flows over interrupted corrugations 28. Interrupted corrugations 28 also mix vapor 14 and improve contact between liquid 12 and vapor 14.

Channeling of liquid 12, which in typical cross-corrugated packing occurs in the valleys of the corrugations, is minimized and counteracted by the frequent interruptions and remixing of the flows provided by the offset-vertex configurations provided by the invention. The improved mixing of the liquid and vapor increases efficiency with a surprisingly lower pressure drop because of the more vertical flow of vapor up through the packing.

Of course, the size, and shape of layer 24 and corrugations 28, the size, orientation, and number of vertex offsets, the angles of inclination of the rows of corrugations 28, and the arrangement of layers 24 relative to adjacent layers 24 in packing element 20 can be varied to suit different applications.

Other embodiments are within the scope of the following claims.

For example, the packing element layers may alternatively be made from other suitable materials, such as plastic, ceramic, textile fabrics (i.e, gauze) stiffened by interwoven metal wires, metallic fabric, or fiberglass.

In addition, in any of the embodiments described herein, fine fluting may be disposed on the surfaces of the layer to further enhance mixing efficiency.

I claim:

1. A device for enhancing contact between a first fluid having a predominant direction of flow and a second fluid, comprising
   a layer of material generally disposed in a plane that is aligned with said direction of flow,
   said layer having a plurality of rows of corrugations projecting out of said plane for deflecting said first fluid and said second fluid, each of said corrugations having an elongated vertex,
   each said row of corrugations being arranged in a diagonal with respect to said direction of flow so that the elongated vertex of each corrugation in said row is offset from the elongated vertex of an adjacent corrugation in said row with respect to said diagonal and is spaced therefrom by an aperture disposed in said layer.

2. The device of claim 1 wherein at least one of said corrugations includes a plurality of openings therein disposed in parallel with said elongated vertex.

3. The device of claim 1 wherein said rows of corrugations are arranged generally parallel each other.

4. The device of claim 1 wherein said layer comprises metal.

5. The device of claim 1 wherein each said row of corrugations is further arranged so that the elongated vertices of adjacent said corrugations in said row are offset in opposite directions with respect to said diagonal.

6. The device of claim 5 wherein each said row of corrugations is further arranged so that the elongated vertex of each corrugation in said row is aligned with the elongated vertex of a next adjacent corrugation in said row with respect to said diagonal.

7. The device of claim 5 wherein each said aperture in said row of corrugations is elongated in a direction that is transverse to said diagonal.

8. The device of claim 7 wherein the directions of elongations of the apertures are orthogonal to said diagonal.

9. The device of claim 7 wherein corrugations of adjacent said rows project in opposite directions with respect to said plane.

10. The device of claim 9 further arranged so that the directions of elongation of the apertures of adjacent ones of said rows of corrugations are aligned with each other.

11. A device for enhancing contact between a first fluid having a predominant direction of flow and a second fluid, comprising
a layer of material generally disposed in a plane that is aligned with said direction of flow,
said layer having a plurality of rows of corrugations protecting out of said plane for deflecting said first fluid and said second fluid, the corrugations of adjacent said rows protecting in opposite directions with respect to said plane,
each of said corrugations of said layer having an elongated vertex, with each said row of corrugations being arranged in a diagonal with respect to said direction of flow so that the elongated vertices of adjacent said corrugations in said row are offset in opposite directions with respect to said diagonal, the directions of elongation of the apertures of adjacent said rows of corrugations being offset from each other,
each said row of corrugations including a series of apertures each of which is disposed between adjacent said corrugations of said row, said apertures being elongated in a direction that is transverse to said diagonal.

12. The device of claim 11 wherein the apertures of each said row of corrugations are disposed between the apertures of the adjacent said rows of corrugations along said diagonal.

13. The device of claim 11 wherein the directions of elongation of the apertures of next adjacent ones of said rows of corrugations are aligned with each other.

14. A device for enhancing contact between a first fluid having a predominant direction of flow and a second fluid, comprising
a layer of material generally disposed in a plane that is aligned with said direction of flow,
said layer having a plurality of rows of corrugations projecting out of said plane for deflecting said first fluid and said second fluid, each of said corrugations having an elongated vertex,
each said row of corrugations being arranged: (1) in a diagonal with respect to said direction of flow so that the elongated vertex of each corrugation in said row is offset from the elongated vertex of an adjacent corrugation in said row with respect to said diagonal, and (2) so that the elongated vertex of each corrugation in said row is offset from the elongated vertex of every other corrugation in said row with respect to said diagonal.

15. The device of claim 14 wherein each said row of corrugations includes a series of apertures each of which is disposed between adjacent said corrugations of said row, said apertures being elongated in a direction that is transverse to said diagonal.

16. The device of claim 15 wherein corrugations of adjacent said rows of corrugations project in opposite directions with respect to said plane.

17. The device of claim 16 wherein the apertures of adjacent said rows of corrugations are generally aligned with each other.

18. The device of claim 15 wherein the directions of elongation of the apertures are oblique to said diagonal.

19. The device of claim 18 wherein the directions of elongation of the apertures are at an angle of between 10° and 170° with respect to said diagonal.

20. A packing element for enhancing contact between a first fluid having a predominant direction of flow and a second fluid, comprising
a plurality of adjacently disposed layers of material, each of which is disposed generally in a plane that is aligned with said direction of flow,
each one of said layers having a plurality of rows of corrugations projecting out of said plane for deflecting said first fluid and said second fluid, each of said corrugations having an elongated vertex,
each said row of corrugations being arranged in a diagonal with respect to said direction of flow so that the elongated vertex of each corrugation in said row is offset from the elongated vertex of an adjacent corrugation in said row with respect to said diagonal and is spaced therefrom by an aperture disposed in said layer.

21. The packing element of claim 20 wherein each said row of corrugations of each one of said layers is further arranged so that the elongated vertices of adjacent said corrugations in said row are offset in opposite directions with respect to said diagonal.

22. The packing element of claim 20 wherein said layers are arranged so that said rows of corrugations of adjacent ones of said layers are oriented in opposite diagonal directions with respect to said direction of flow.

23. The packing element of claim 22 wherein said layers are arranged so that at least some of said corrugations of adjacent ones of said layers are in contact.

24. The packing element of claim 20 wherein each said aperture in said row of corrugations of each one of said layers is elongated in a direction that is transverse to said diagonal.

25. The packing element of claim 24 wherein the directions of elongation of the apertures are at an angle of between 10° and 170° with respect to said diagonal.

26. The packing element of claim 24 wherein the directions of elongation of the apertures are orthogonal to said diagonal.

27. A packing element for enhancing contact between a first fluid having a predominant direction of flow and a second fluid, comprising
a plurality of adjacently disposed layers of material, each of which is disposed generally in a plane that is aligned with said direction of flow,
each one of said layers having a plurality of rows of corrugations projecting out of said plane for deflecting said first fluid and said second fluid, each of said corrugations having an elongated vertex,
each said row of corrugations being arranged in a diagonal with respect to said direction of flow so that the elongated vertex of each corrugation in said row is offset from the elongated vertex of an adjacent corrugation in said row with respect to said diagonal, each said row of corrugations of each one of said layers being further arranged so that the elongated vertex of each corrugation in said row is offset from the elongated vertex of every other corrugation in said row with respect to said diagonal.

* * * * *